(12) United States Patent
Larsson et al.

(10) Patent No.: US 8,243,655 B2
(45) Date of Patent: Aug. 14, 2012

(54) EXCHANGE OF INFORMATION IN A COMMUNICATION NETWORK

(75) Inventors: Peter Larsson, Solna (SE); Niklas Johansson, Sollentuna (SE); Mikael Prytz, Rönninge (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 616 days.

(21) Appl. No.: 12/517,747

(22) PCT Filed: Dec. 4, 2006

(86) PCT No.: PCT/SE2006/050536
§ 371 (c)(1),
(2), (4) Date: Jun. 4, 2009

(87) PCT Pub. No.: WO2008/069713
PCT Pub. Date: Jun. 12, 2008

(65) Prior Publication Data
US 2010/0074177 A1 Mar. 25, 2010

(51) Int. Cl.
*H04W 40/00* (2009.01)
(52) U.S. Cl. .......................... 370/328; 370/338
(58) Field of Classification Search .................. 370/328, 370/338, 312, 265, 270, 271
See application file for complete search history.

(56) References Cited

U.S. PATENT DOCUMENTS

| 7,089,298 B2 * | 8/2006 | Nyman et al. ................. 709/220 |
| 2004/0110508 A1 * | 6/2004 | Haartsen ........................ 455/445 |
| 2005/0193106 A1 | 9/2005 | Desai et al. |
| 2005/0198207 A1 * | 9/2005 | Hoblit ........................... 709/219 |
| 2006/0063490 A1 * | 3/2006 | Bader et al. ..................... 455/45 |
| 2008/0101252 A1 * | 5/2008 | Bui ................................ 370/252 |
| 2008/0107091 A1 * | 5/2008 | Ramachandran ............. 370/338 |

FOREIGN PATENT DOCUMENTS
EP 1612982 A2 1/2006

OTHER PUBLICATIONS

Katti, S. et al. "The Importance of Being Opportunistic: Practical Network Coding for Wireless Environments." 2005. Available online at: http://www.cs.jhu.edu/~cs647/class-papers/cope.pdf.

* cited by examiner

*Primary Examiner* — Brian D Nguyen
(74) *Attorney, Agent, or Firm* — Coats & Bennett, P.L.L.C.

(57) ABSTRACT

A portable node capable of forming ad hoc networks with other nodes is disclosed, as well as a method of transferring at least a first and a second information entity (e.g. files) from a first node to other nodes in an ad hoc network. At least the first and the second information entities are jointly encoded, in the first node, into a composite information entity) in a manner so that the composite information entity can be decoded by use of at least the first information entity or the second information entity. The composite information entity is subsequently transmitted.

22 Claims, 6 Drawing Sheets

Fig. 4

| 405 | 300 | 410 |

400

EXCHANGE OF INFORMATION IN A COMMUNICATION NETWORK

FIELD OF THE INVENTION

The present invention relates to the field of ad hoc communications networks, and in particular to the field of information exchange in an ad hoc network.

BACKGROUND

Many mobile wireless electronic devices of today can communicate with surrounding devices and thus act as nodes in an ad hoc network. Ad hoc networks are spontaneous, self-configuring networks with no fixed infrastructure, which may be formed when electronic devices are in the vicinity of each other. Nodes may enter into, or exit from, an ad hoc network as the different devices approach or move away from each other, respectively. The nodes forming an ad hoc network are normally on a par with each other, so that none of them have a different responsibility for the transmission within the network than the other nodes. Typically, a node in an ad hoc network is a portable, battery-powered device such as a laptop computer, a personal digital assistant, an MP3 player or a multimedia mobile phone.

A node in an ad hoc network can be made to exchange information with another node in the ad hoc network, see e.g. M. Jacobsson et al., "Push!Music: Intelligent Music Sharing on Mobile Devices", The 7th International Conference on Ubiquitous Computing, September 2005, wherein a system for pushing music files from a first node in an ad hoc network to another node in the ad hoc network is disclosed. The pushing of music files may be initiated by the user of the first node, or by an agent file software in the first node, which can compare the listening pattern of the first node to that of other nodes in order to identify similar listening patterns and hence potential receivers of the contents of the first node.

Another disclosure of information exchange in an ad hoc network is given in Bach et al., "Bubbles: Navigating Multimedia Content in Mobile Ad-hoc Networks", Proceedings of the 5th Wireless World Conference 2004, Surrey, UK. A system is disclosed wherein a software application in a first node in an ad hoc network can detect when other devices are in the proximity of the node. When another device has been detected, the application in the first node shows a list of available music files in the other device. The end user can then initiate download of information from the other device to the first node via unicast (peer-to-peer) communication.

One of the benefits of information exchange between nodes in an ad hoc network is that the different users of nodes in an ad hoc ad network often know each other (since the nodes were brought in the vicinity of each other), and therefore, the chances that the contents of one node would be interesting to users of the other nodes is high. However, multimedia files, such as music or film files, are often very large. Transmissions of such files between nodes in an ad hoc network are therefore time and/or bandwidth consuming. Since the transfer of large files between nodes generally takes a long time, the power consumed during the transfer of a file is large, which is especially undesirable as the nodes are typically battery-powered. A method that can provide efficient transmission of information between nodes in an ad hoc network is therefore desired.

SUMMARY

A problem to which the present invention relates is how to make the information exchange in an ad hoc network more efficient.

This problem is addressed by a method of transferring at least a first information entity from a first node to a second node and a second information entity from the first node to a third node, wherein the first node comprises the first and second information entities; the second node comprises the second information entity; and the third node comprises the first information entity. The method comprises forming an ad hoc network including at least the first, second and third node. The method is characterised by: jointly encoding, in the first node, at least the first information entity and the second information entity into a composite information entity in a manner so that the first or the second information entity can be used in decoding of the composite information entity; and transmitting, from the first node, a composite message comprising the composite information entity.

The problem is further addressed by computer program code arranged to execute the inventive method when run on computer means, and a portable node capable of forming an ad hoc network with other nodes. The portable node comprises a memory arranged to store information entities such as files containing music or films; an encoder arranged to jointly encode at least a first information entity and a second information entity stored in the memory into a composite information entity in a manner so that the composite information entity can be decoded by use of at least the first information entity or the second information entity; an output, coupled to the encoder, for outputting a composite message including the composite information entity.

The present invention allows for an increase in throughput gain when a first node transmits at least two information entities, since the information entities may be jointly encoded into a composite information entity which is shorter than the sum of the lengths of the at least two information entities.

The throughput gain is particularly large when neither the first nor the second information entities are transmitted from the first node to the second or third nodes after the step of forming the ad hoc network and prior to the step of transmitting the composite message.

According to an embodiment of the invention, a node in the ad hoc network receives identification data identifying information entities stored in connection with at least two other nodes in the ad hoc network, and uses the received identification data in identifying the first and the second information entities to be jointly encoded. By acquiring knowledge of which information entities are stored in the other nodes, the selection of information entities to be used in forming the composite information entity can be efficiently made in a manner so that a composite information entity formed can be decoded by at least two nodes in the ad hoc network. The identification data can be received in the node via a user interface, or from other nodes in the ad hoc network via a connection such as a radio or an infrared connection.

In one embodiment of the invention, a benefit measure of a composite information entity is calculated in a manner so that the benefit measure reflects the throughput gain achieved by transmitting the composite information entity instead of the first and second information entities. The benefit measure can be used when determining which information entities should be used in forming the composite information entity, and for giving priority to different composite information entities that may be formed, so that the composite information entities providing a high benefit can be transmitted first. An ad hoc network can cease to exist at any time, and it is often desirable to begin with transmitting the composite information entities that can convey as much information as possible to as many recipients as possible.

In one aspect of this embodiment, the benefit measure of composite information entities that can be transmitted by other nodes is also calculated, and the scheduling of the composite message is determined by use of benefit measures of composite information entities that may be formed by the first node as well as benefit measures of composite information entities that may be formed by other nodes in the ad hoc network. In this way, the overall efficiency of the ad hoc network can be maximised, so that the node which can form the composite information entity yielding the highest benefit measure can be the first node to transmit, and so forth. In this aspect, information on the length of an information entity stored in a node can preferably be made available to the other nodes, for example via the identification data identifying an information entity, so that the benefit measure calculation can take into account the comparative length of the information entities that are jointly encoded.

The composite message could advantageously comprise identification data of the information entities that have been used in forming the composite information entity of the composite message.

A portable node according to the invention could advantageously further includes an input for receiving a composite message comprising a composite information entity; and a decoder arranged to decode the received composite information entity by use of an information entity stored in the memory. An ad hoc network has a generally flat structure, where all participating nodes are able to transmit and receive information, and where no node has any predefined role or responsibility. Hence, by comprising an input and a decoder, the portable node can receive information entities encoded into a composite message from other nodes.

BRIEF DESCRIPTION OF THE DRAWINGS

For a more complete understanding of the present invention, and the advantages thereof, reference is now made to the following descriptions taken in conjunction with the accompanying drawings, in which:

FIG. 4 illustrates an example of a composite message including a composite information entity.

DETAILED DESCRIPTION

Figure 1:
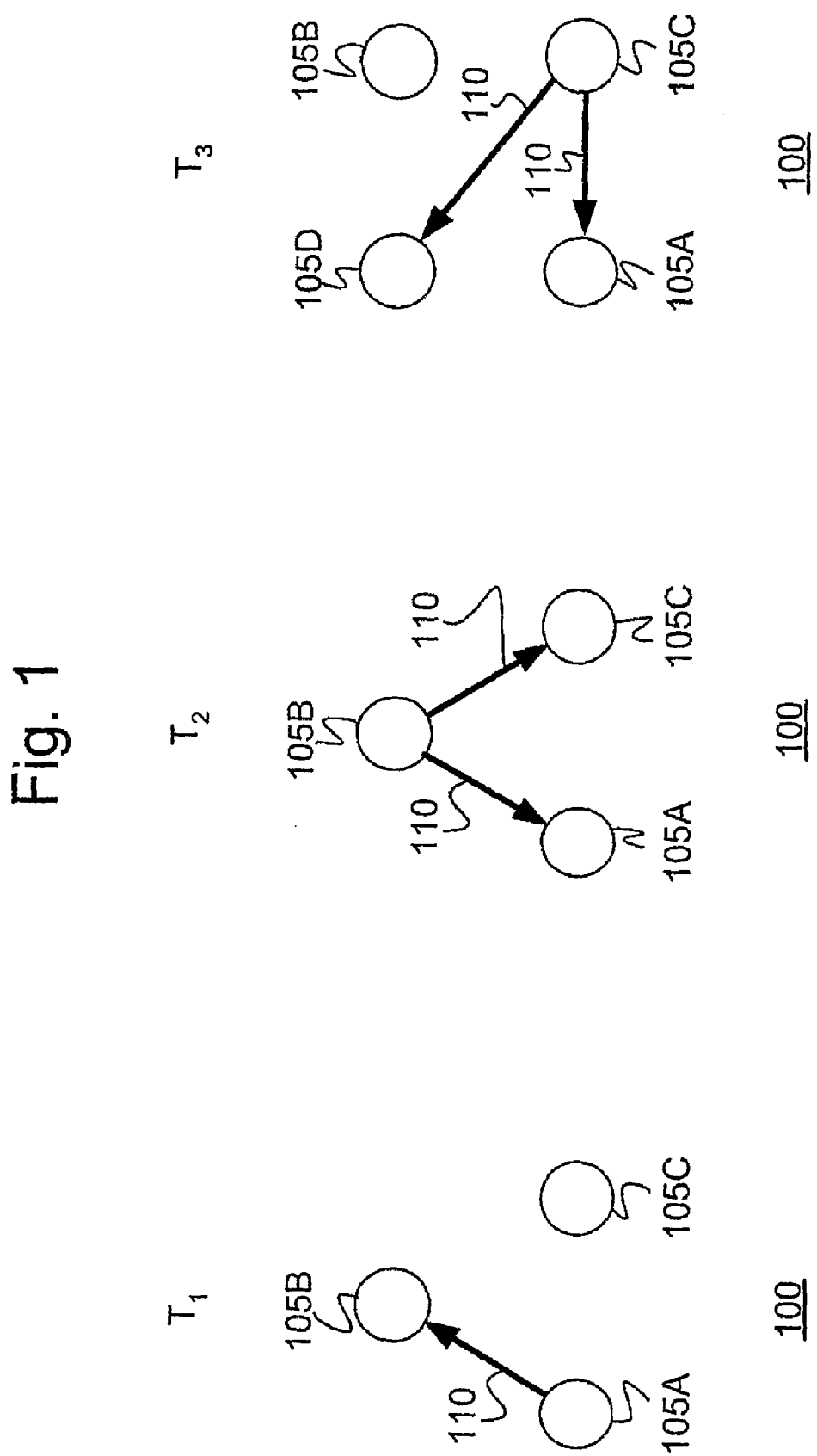
FIG. 1 is a schematic illustration of an example of an ad hoc network at three different point in time.

A schematic illustration of an ad hoc network 100 is given in FIG. 1. An ad hoc network 100 is formed when electronic devices, hereinafter referred to as nodes 105, discover each other via signaling and then form an ad hoc network 100. Electronic devices which may act as nodes 105 in an ad hoc network are often mobile wireless electronic devices such as laptop computers, personal digital assistants, MP3-players and multimedia mobile phones. Such mobile wireless electronic devices can also communicate with stationary (wireless or wired) electronic devices, such as personal computers and servers in local area networks. An ad hoc network 100 can comprise a mixture of mobile and stationary devices forming nodes 105.

The ad hoc network 100 of FIG. 1 is illustrated at three different points in time: $T_1$, $T_2$ and $T_3$. At these points in time, the ad hoc network 100 comprises the nodes 105A, 105B and 105C. At the point in time $T_3$, the ad hoc network 100 further comprises a node 105D. The ad hoc network 100 may be a full mesh, wherein all nodes 105 can hear all other nodes 105, or partial mesh, wherein all nodes 105 cannot hear all other nodes 105 within the network 100. Generally, any node 105 of an ad hoc network 100 can act as a transmitter or receiver of information, and typically, no node 105 has a more central role in the ad hoc network 100 than the other nodes 105. The nodes 105 that are included in an ad hoc network 100 vary over time, as the electronic devices forming the nodes 105 approach or move away from each other. When only one node 105 of a previous ad hoc network 100 is still present, the ad hoc network 100 ceases to exist.

In ad hoc network 100 of FIG. 1, node 105A is illustrated to transfer information to node 105B at time $T_1$. At time $T_2$, node 105B is illustrated to transfer information to nodes 105A and 105C. At time $T_3$, node 105C is illustrated to transfer information to nodes 105A and 105D. At other times, other transfer situations may occur, or there may be points in time when no transfer at all takes place in ad hoc network 100. The information transferred at different times is illustrated by information transfer signals 110, indicated by arrows in FIG. 1.

The object of forming an ad hoc network 100 is normally to exchange information between nodes 105. Information can be exchanged either in a unicast transmission from one node 105 to another node 105, or in a multicast transmission from one node 105 to two or more other nodes 105. According to the invention, the amount of data transmitted within an ad hoc network 100 can be reduced by acknowledging that some of the nodes 105 forming an ad hoc network 100 may have one or more information entities in common. In the following, the exchange of information between three nodes is given as an example. However, further nodes could be involved for an even more efficient communication.

Figure 2:
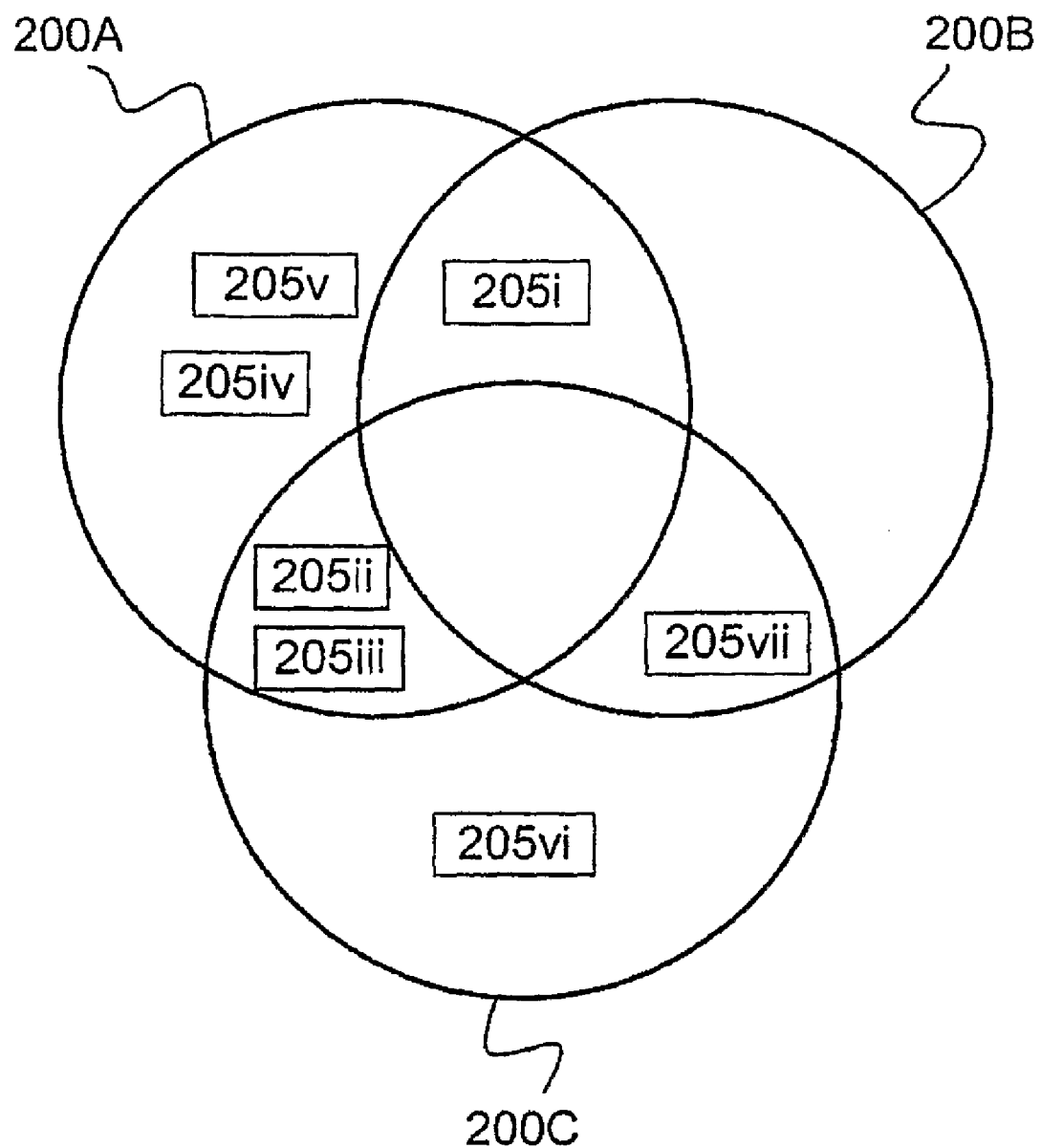
FIG. 2 illustrates an example of how the contents of different nodes in an ad hoc network may overlap.

FIG. 2 illustrates the contents 200A, 200B and 200C of three nodes 105A, 105B and 105C, respectively, of an ad hoc network 100. The information stored in a node 105 can be seen as being formed of one or more information entities 205. An information entity 205 can e.g. be a music file, a text file, a film file, or any other set of data that can be identified and distinguished by a node 105. As is illustrated in FIG. 2, the contents 200 of different nodes 105 may overlap already before any information exchange within the ad hoc network 100 takes place, i.e. the contents of two or more nodes 105 may comprise the same information entiti(es) 205. In the example given in FIG. 2, the contents 200A and 200B both include the information entity 205$i$, while the contents 200A and 200C both include the information entities 205$ii$ and 200$iii$. Furthermore, the contents 200B and 200C both include the contents 200$vii$.

According to the invention, the fact that an information entity 205 is often included in the contents 200 of two or more nodes 105 in an ad hoc network 100 is utilised for reducing the amount of information that has to be transmitted within ad hoc network 100 in order for a node 105 to share parts or all of its contents 200 with some or all of the other nodes 105 of ad hoc network 100. An information entity 205 stored in two different nodes 105 could either have been received by the two nodes 105 from different sources, from the same source, or one of the nodes 105 could have received the information entity 205 from the other node 105 (e.g. in a different ad hoc network formation). When the contents 200A of a node 105A comprise an information entity 205$i$ as well an information entity 205ii, wherein the contents 200B of a node 105B comprise the information entity 205i but not the information entity 205ii, while the contents 200C of a node 105C include the information entity 205ii but not the information entity 205i, the amount of data that has to be transmitted within ad hoc network 100 can be reduced by forming a composite information entity from the information entities 205i and 200ii prior to transmitting. Such a composite information entity could for example be formed by performing a bitwise XOR operation on the information entities 205i and 205ii. The node 105B which already contains the information entity 205i can, after having received the composite information entity, retrieve the unknown information entity 205ii by performing a bitwise XOR operation on the composite information entity and the known information entity 205i. Similarly, the node 200C can retrieve the unknown information entity 205i by performing a bitwise XOR operation on the composite information entity and the known information entity 205ii. Thus, rather than performing a first transmission of information entity 205i, and a second transmission of information entity 205ii, a single transmission of the composite information entity can ensure that the nodes 105 in ad hoc network which contain one of information entities 205i and 205ii, but not the other, will receive the information entity 205 not previously part of the contents of nodes 105. The transmission efficiency of the ad hoc network 100 is thus improved, implying reduced transmission times and/or reduced bandwidth consumption, as well as reduced power consumption. In order for the inventive method to reduce the amount of data that has to be transmitted within the ad hoc network 100, there should be at least a first node 105 that includes at least a first information entity 205 that is known by a second node 105B but not by a third node 105, as well as a second information entity 205 that is known by the third node 105, but not by the second node 205.

In the example given above in relation to FIG. 2, the information entities 205i and 205ii are part of the contents 200 of node 105A, as well as of the contents 200 of nodes 105B and 105C, respectively. In a larger ad hoc network 100, the information entities 205i may be included in the contents 200 of more than one node 105. Likewise, the information entity 205ii may be part of the contents 200 of more than one node 105. All nodes 105 having the information entity 205i but not the information entity 205ii in their contents 200 can use the composite information entity in combination with information entity 205i in order to retrieve information entity 205ii, and vice versa.

As mentioned above, the composite information entity may be formed by use of a bitwise XOR operation on the two information entities 205i and 205ii. Other operations may alternatively be used in forming the composite information entity, such as joint encoding over other Galois fields. One may for example perform a modulus sum encoding over a segment of b bits at a time, i.e. using Galois field $2^b$. An example of how a composite information entity 300 can be formed is further illustrated in FIG. 3, in which a modulus sum is performed on a first information entity 205i, comprising n segments 305 referred to as $A_1$-$A_n$, and a second information entity 205ii, comprising m segments 305 referred to as $B_1$-$B_m$. The resulting composite information entity 300 comprises n composite segments 310 (assuming that n≧m), where the $k^{th}$ composite segment 310 contains the information $A_k \oplus B_k$, the symbol $\oplus$ representing summation in any field. If m<n, the second information entity 205ii, comprising m segments 305, can advantageously be padded with zero words for the trailing (n−m) segments. A segment 305/310 could consist of one or more bits, and an information entity 205 could comprise any number of segments 305. When one of the information entities 205 used to form the composite information entity 300 comprises more segments 305 than the other, zero padding could be applied so that the last composite segments 310 of composite information entity 300 would simply correspond to the last segments 310 of the longer information entity 205 (see FIG. 3), or alternative methods, such as repetition coding, could be used.

Figure 3:
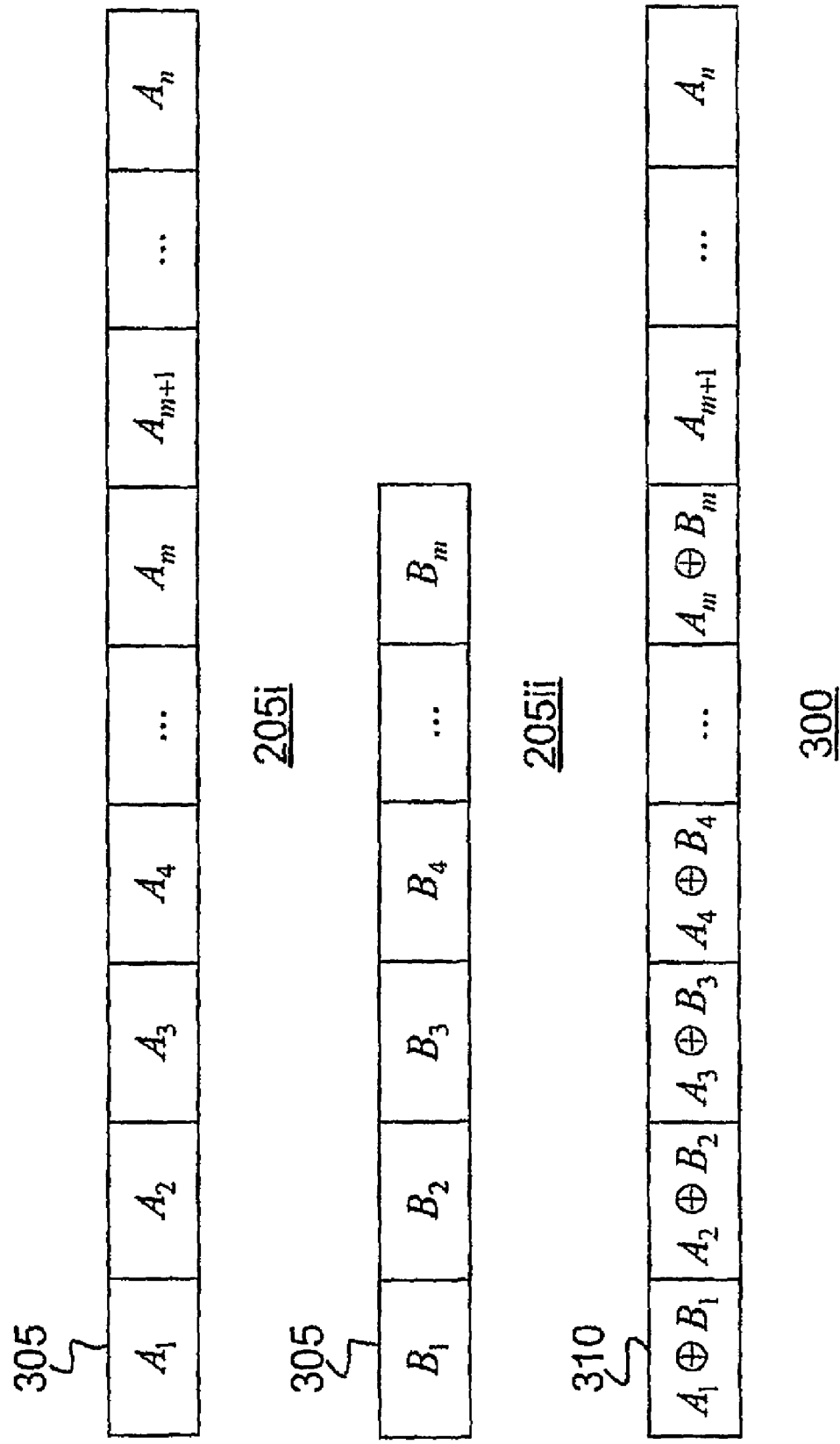
FIG. 3 illustrates the forming of a composite information entity from two different information entities.

A node 105, receiving the composite information entity 300 of FIG. 3 and having the information entity 205i as part of its contents 200, can thus retrieve the information entity 205ii by performing the modulus sum operation on the composite information entity 300 and the information entity 205i over the n segments of composite information entity 300, since $A_k \oplus A_k \oplus B_k = B_k$.

A composite information entity 300 could be formed from more than two information entities 205, if at least two nodes 105 have more than one information entity 205 in common. If so, the shared information entities 205 could for example be concatenated, and the joint encoding would be performed on the concatenated information entity. In the example illustrated in FIG. 2, the information entities 205ii and 205iii could be concatenated, and the concatenated information entity could be jointly encoded with the information entity 205i. This would be particularly advantageous if both of the information entities 205ii and 205iii both smaller than the information entity 205i.

Moreover, provided sufficient information resides in the receiving nodes 105, multiple information entities 205 can efficiently be encoded into the same composite information entity 300: $A_k \oplus B_k \oplus C_k \oplus \ldots$, where $A_k$ is a segment of a first information entity 205i, $B_k$ is a segment of a second information entity 205ii, $C_k$ is a segment of a third information entity 205iii etc, (where an information entity 205 may or may not be a concatenated information entity, cf. the preceding paragraph). This allows more than two information entities 205 to be transmitted in the same composite message 400. For example, if a first node 105A has information entities 205i, 205ii and 205iii, a second node 105B has information entities 205i and 205ii, a third 105C has information entities 205i and 205iii, and a fourth node 105D has information entities 205ii and 205iii, then the first node 105A may advantageously transmit a composite information entity 300 comprising the composite segments $A_k \oplus B_k \oplus C_k$. Each of the receiving nodes 105B, 105C and 105D may, from the a priori information and the composite information entity 300, decode a missing information entity 205. Thus, a composite information entity 300 can be decoded by using all but one of the information entities 205 that were used in forming the composite information entity.

Figure 4:
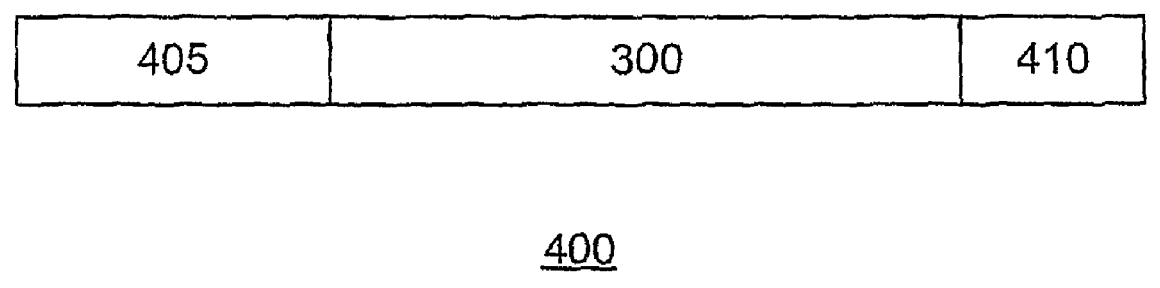

A composite message 400 having as its payload the composite information entity 300 is exemplified in FIG. 4. The composite message 400 of FIG. 4 further includes a header 405, in which information is included on the identity of the information entities 205 (two or more) which have been used to form the composite information entity 300. An identifier identifying the composite message as a composite message could also be included in the header, e.g. as a composite message flag. Furthermore, a Cyclic Redundancy Check (CRC) code 410 can be included as a tail in composite message 400. The composite message 400 of FIG. 4 is given as an example only, and other formats of the composite message 400 may be employed.

In an ad hoc network 100 where the concatenation of information entities 205 is allowed, the header 405 could preferably comprise information on which information entities 205 have been concatenated, how the different information entities 205 are coded together and in which order the different information entities 205 appear in the concatenated information entity.

A composite message 400 comprising a composite information entity 300 may include an address field comprising the addresses of the first nodes(s) 105 and the second node(s) 105 by which the composite information entity 300 could be used for retrieving additional information, or message 400 could be sent as a multicast message to all the nodes 105 of ad hoc network 100, thus not needing an address field. Nodes 105 which already have both information entities 205$i$ and 200$ii$ as part of their contents, as well as nodes 105 which have neither information entity 205$i$ nor 200$ii$, can either ignore the composite message 400, or store the composite message 400 for future use—a node 105 which do not at the moment have information entity 205$i$ nor 200$ii$ in its contents 200 may at a later point in time receive one of information entities 205$i$ and 200$ii$, and can then, if composite message 400 has been stored, retrieve the other information entity 205.

By sending the composite message 400 comprising the composite information entity 300, the amount of data that has to be transmitted by the transmitting node 105 is greatly reduced. The amount of extra payload that would have to be transmitted if the information entities 205$i$ and 200$ii$ were to be sent separately (either in the same message or in two different messages) instead of in a composite message 400, would be equal to the number of bits of the shorter of the two information entities 205 used to form the composite information entity 300. The composite message 400 can simultaneously convey a first information entity 205 to at least one node 105 and second information entity 205 to at least one other node 105 while using the payload space of the longer information entity 205, since a priori information stored in the respective nodes 105 is used for extracting the respective unknown information entities 205. Furthermore, the probability of successful reception is higher for the transmission of a composite information entity 300 than for the transmission of a single information entity 205.

Information entities 205 that are stored in one node 105 only, such as information entities 205$iv$, 205$v$, and 205$vi$ of FIG. 2, could in a first step be transmitted to at least one other node 105 in a conventional manner, and could subsequently be encoded into a composite information entity 300.

Figure 5:
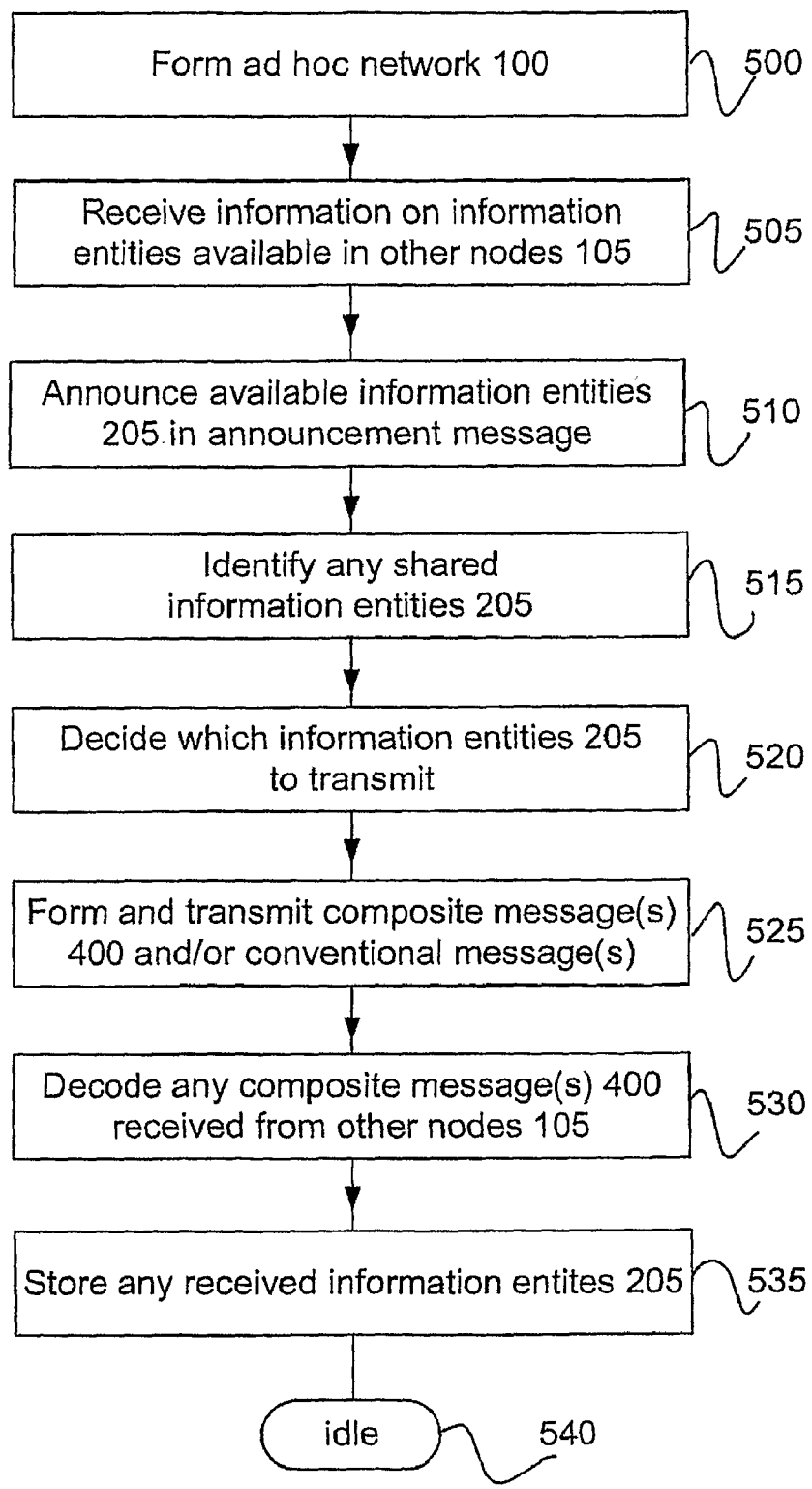
FIG. 5 is a flowchart schematically illustrating an embodiment of the inventive method.

FIG. 5 is a flowchart schematically illustrating an embodiment of the inventive method. In step 500, a node 105A detects other nodes 105 and an ad hoc network 100 is formed. The detection may be initiated by a node 105 requesting other nodes 105 to reveal their presence, or by a node 105 announcing its presence followed by other nodes 105 replying to the announcement. The degree of user involvement in the forming of an ad hoc network 100 may vary. Preferably, the identities of the nodes 105 are made known to the other nodes 105 during the formation of the ad hoc network 100. If the identities of the nodes are announced, the transmission of information entities 205 to a receiving node 105 could be made conditional on the approval of the sending node 105 by the receiving node 105. The identity of the node 105 may for example be represented by a Media Access Control (MAC) address. Alternatively, temporary identities may be used in order to distinguish the different nodes 105 from each other.

In step 505, identification data relating to which information entities 205 are stored in other nodes 105 in ad hoc network 100 and available for transmission is received by node 105A. Such identification data could for example be received by a user of node 105A manually entering the information via a user interface (for example, after having exchanged identification data with other users of ad hoc network 100 over other media, such as through voice or visual means). Alternatively, one or more of the other nodes in ad hoc network 100 could automatically send announcement messages, in which information on which information entities 205 are available from the node 105 is included (cf. step 510), or node 105A could receive the information on which information entities 205 are available from a node 105 as a response to a polling message previously sent by node 105A.

In step 510, the node 105A announces which information entities 205 that node 105A can share with other nodes 105. This may include all information entities 205 stored upon node 105, or a selection of the information entities 205 stored upon node 105A. The node 105A may make the announcement by means of an announcement message, which could preferably be transmitted as a broadcast message to all the other nodes 105 in ad hoc network 100. An announcement message preferably comprises the identity of the node 105A, as well as identification data identifying information stored in the node 105A. The identification data provided in an announcement message could e.g. be in the form of a list of information entity identifiers, wherein each information entity identifier identifies an information entity 205 stored upon the node 105. Alternatively, information on which information entities 205 are available for transmission to other nodes could be transmitted in response to polling messages received. In an implementation in which this information is entered manually into the nodes 105 via a user interface, step 510 could be omitted.

If step 505 involves the receipt of one or more announcement messages, the announcement performed in step 510 could take place before the receipt of all or part of the announcement messages from other nodes 105, i.e. before or during step 505.

In step 515, the information received in step 505 is analysed, and any information entities 205 that are stored in the contents 200 of both node 105A and another node 105 are identified. The analysis of step 515 includes comparing information entity identifiers identifying information entities 205 stored in the other nodes 105 of ad hoc network 100 in order to identify any shared information entities 205.

In step 520, it is determined which information entities 205 should be transmitted by node 105A based on the information received in step 505 regarding the available information entities 205 in other nodes 105 and information regarding the information entities 205 stored in node 105A. Furthermore, it is decided whether it is advantageous to form any composite information entities 300 of the information entities 205 that should be transmitted. If there is a pair (or group) of information entities 205 among the contents 200 of node 105A wherein a first information entity 205 of the pair/group is stored in at least one node 105 which comprises all but one of the information entities 205 of the pair/group as part of its contents 200, and the other information entity/ies 205 of the pair/group is stored in at least one other node 105 not having the first information entity 205 of the pair/group as part of its contents 200, then it may advantageously be determined in step 520 that the information entities 205 of this pair/group should be encoded into a composite information entity 300. Information entities 205 which cannot be grouped into such a pair/group may be transmitted in a conventional manner in a conventional message.

Furthermore, an analysis of the benefit of forming a particular composite information entity 300 could also be performed in step 520, resulting in a benefit measure, for example by calculating the reduction in transmission resources used for the transmission of a composite message 400 comprising the composite information entity 300 compared to transmitting the information entities 205 of the composite information entity 300 in a conventional manner. Such a benefit measure could e.g. depend on the number of nodes 300 which would be able to decode the composite information entity 300, as well as on the length ratio of (or the difference in length between) the information entities 205 used to form the composite information entity 300 (or the difference between the concatenated information entities, if applicable). The benefit measures of the different composite messages 400 could then be compared, and the comparison could e.g. be used for determining the order in which the composite messages 400 should be transmitted.

In step 525, composite and/or conventional messages are formed and transmitted in accordance with the analysis performed in step 520, preferably as multicast messages.

In step 530, any composite messages 400 received from other nodes 105 are decoded. Given that the format of the composite message 400 of FIG. 4 is used, the header 405 of a received composite message 400 is analysed in order to identify which information entities 205 were used when forming the composite information entity 300 included in the composite message 400. If all but one of those information entities 205 are already stored in node 105A, then the composite information entity 300 can be decoded by use of the known information entities 205 and information entity 205 that is not already stored in node 105A can be retrieved.

In step 535, any new information entities 205 which have been received/retrieved are stored into the contents 200 of node 105A. In step 540, the process ends.

When a node 105A transmits an information entity 205 to another node 105, lower layers in node 105A could preferably send a signal to the application indicating when the transmission is completed. Furthermore, an acknowledgement of receipt could be sent by a node 105 having received a composite information message 300. Information entity identifiers, identifying information entities that have been transmitted between nodes 105, could be continuously transmitted within ad hoc network 100 in order to update the nodes 105 of ad hoc network 100 of which information entities are known by which nodes 105.

The inventive method assumes that the nodes 105 forming the ad hoc network 100 have a common way of identifying the information entities 205, so that an information entity 205 identified as "X" by a first node 105 corresponds to an information entity 205 identified as "X" by any other node 105 within the ad hoc network 100. In one embodiment of the invention, an information entity 205 could be associated with a unique or random alphanumeric name to be used as an information entity identifier. Both the information entity 205 and the information entity identifier could then advantageously be integrity protected with a hash code of the whole sequence of data (methods for this are well known in art of encryption). The use of a hash code ensures that any changes to an information identity identifier may be detected. The hash code of an information entity 205 could be sent as part of a message including identification of information entities 205 stored in a node 105 (announcement message or response to a polling message), in order to ensure correct identification of an information entity 205. The hash code could also be included in the header 405 of a composite message 400.

Other methods for common identification of information entities 205 in different nodes 105 can alternatively be used.

The determination in step 520 of which information entities 205 are to be transmitted by node 105A could in one embodiment be based on the assumption that each node 105 desires to have as many information entities 205 as possible as part of its contents 200. Hence, node 105A would assume that any node 105 which does not have a particular information entity 205 would like to receive the information entity 205. In an alternative implementation, rather than assuming that all other nodes 105 should contain all available information entities 205 when the exchange of information entities has been completed, a node 105 could await a request for a particular information entity 205 from at least one other node 105 prior to sending the information entities 205 (or a composite information entity formed from the information entity) to the other nodes 105. A node 105 requiring a particular information entity 205 would hence request the information entity 205 which, according to a received announcement message, is stored as part of the contents 200 of another node 105.

If there exists at least one node 105 which does not comprise any of the information entities 205 of a pair of information entities 205 which is partly shared by other nodes as described above, and which requires the information entities 205 of the pair, it might be considered to send the information entities 205 of such a pair in a conventional manner to all nodes 105, since transmission of conventional message(s) would be required for the node 105 which does not contain the information entities 205. Alternatively, a conventional message including one of the information entities 205 of the pair could be transmitted, as well as the composite message 400, so that the node 205 lacking both information entities could use the information entity 205 of the conventionally transmitted message for the decoding of a composite message 400.

The flow chart in FIG. 5 illustrates the transmission and receipt of information entities 205 by one node 105A. However, the method cannot be performed independently of the other nodes in the ad hoc network 100, as is indicated in steps 505 and 530. Rather, the method of FIG. 5 would involve all or a part of the nodes 105 in ad hoc network 100 (at least three), and any node 105 in the ad hoc network 100 could, from time to time, take the role as the sending node 105 of composite messages 400. Hence, step 525, in which composite messages are transmitted by the node 105A, would normally include waiting for access to the transmission medium while other nodes 105 transmit.

The invention can use any MAC protocol, such as 802.11, ALOHA, CSMA, etc. The performance can be further improved if the order in which the nodes 105 transmit is coordinated and coupled, from the application point of view, with the MAC layer.

More precisely, which node 105 shall transmit at which point in time can be determined in different ways. For example, a so called round robin scheme could be used, according to which the nodes 105 in the ad hoc network 100 take turn to send one or a predetermined number of information messages 400 (composite or regular messages) at a time. The order in which the nodes 105 transmit could for example be based on the MAC address number. Alternatively, a negotiation could take place between the nodes regarding which round robin order should be used.

In another embodiment, a randomization procedure is used in order to determine which node 105 should transmit at a certain point in time. When a transmitting node 105 has stopped sending, the other nodes 105 in ad hoc network 100 could randomly generate a counter value and start a count down/up until a predetermined number has been reached. The first node 105 to reach the predetermined number would start the transmission of messages. If multiple nodes transmit at the same time, this may be detected by outstanding acknowledgements, and a collision resolution mechanism may be used. If the transmission medium is blocked by another transmission, the application layer of a node 105 can advantageously be made to wait with any transmissions until the transmission medium becomes free, and then determine which composite entity to transmit.

In an alternative embodiment, a leading node 105 is selected in step 500 when the ad hoc network is formed. The leader can then determine in which order the nodes 105 will transmit. This decision is then communicated to the other nodes.

In yet another embodiment, the access to transmission can be determined by decentralised scheduling decisions. Assuming that all nodes 105 know exactly which information entities 205 are available at all nodes 105 in the ad hoc network 100, each node 105 may run a decentralised scheduling algorithm that decides which information entities 205 should be transmitted first, second and so forth. In other words, step 515 of FIG. 5 could be run by each node 105 for all nodes 105. Each node would then know which information entities 205 and composite information entities 300 should be transmitted by every node 105 in the ad hoc network 100. The order in which these information entities 300/205 should be transmitted could then be determined by determining the benefit of transmitting each information entity 300/205. A benefit measure could be calculated for each message to be transmitted within the network, cf. the text above in relation to step 520, and the order in which the messages should be transmitted could be determined based on this benefit measure. If one or more messages are of the same benefit measure, secondary rules could apply.

The centralised scheduling decisions could be more efficiently made if the respective lengths of the information entities stored the different nodes 105 were known by the nodes 105, so that the benefit measures on which the scheduling decisions are made could account for the gain achieved by forming a particular composite information entity 300. Information on the length of an information entity 205 could e.g. be included in the announcement messages discussed above, or in a response to a polling message.

A node 105 should preferably compare the information entities in any not yet transmitted messages with the information entities in messages sent by other nodes 105, in order to avoid the risk of sending messages comprising information entities that have already been transmitted by other nodes.

Further steps could be included in the process illustrated by FIG. 5. For example, a check could be added prior to entering step 540 as to whether the exchange of information entities 205 between the nodes 105 is completed. If a new node 105 enters the ad hoc network 100, the process of FIG. 5 could in one embodiment be interrupted and started from the beginning in step 500. In an alternative embodiment, new nodes 105 are ignored until the process of FIG. 5 has ended. Step 500 could then be re-entered, including any new nodes 105.

The embodiment illustrated in FIG. 5 is based on an announcement made by the nodes 105 in the ad hoc network 100 of which information entities 205 that are available to the other nodes (cf. steps 510 and 505). As mentioned above, the step 510 of announcing the contents 200 could in an alternative embodiment be omitted. Instead, the node 105A could poll the other nodes 105 in the ad hoc network 100 for one or more particular information entities 205, or the information could be entered manually into node 105A via a user interface. The polling could for example be user initiated, or the user of a particular node 105 could have programmed the node 105 to poll for particular information entities 205 prior to the formation of the ad hoc network 100. All nodes 105 having the polled information entiti(es) as part of their contents 200 may reply that the required information entiti(es) 205 are available. This response could be eavesdropped by all or some of the other nodes 105 in the ad hoc network 100. By overhearing the response(s) to polling messages, which may be sent as unicast or broadcast messages, these other nodes 105 will get information on which other nodes 105 contain the polled information entitie(is) 205, and will thereby get information on the a priori information entities 205 contained in the other nodes 205. Encoding into composite information entities 300 of any transmitted information entities 205 can then be made accordingly.

Figure 6:
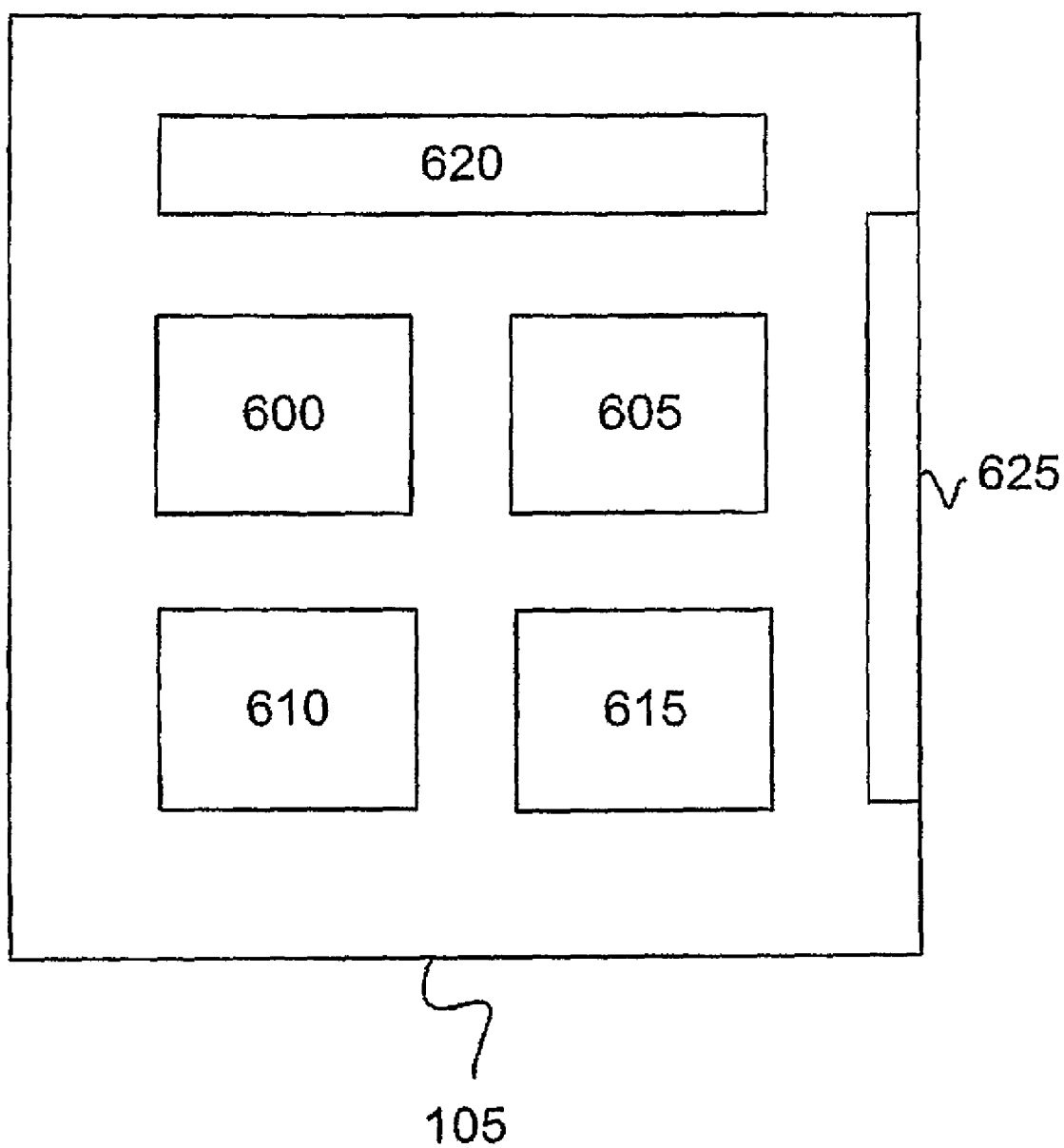
FIG. 6 illustrates an example of a node according to the invention.

An embodiment of a node 105 according to the invention is schematically illustrated in FIG. 6. Node 105 of FIG. 6 comprises storage means 600, onto which the contents 200 of node 105 is stored. The contents 200 may be stored in storage means 600. Storage means 600 further includes identification data identifying information entities stored in storage means 600, such as information entity identifiers. Node 105 further includes an information en/de-coder 605, which comprises processing means and computer program code for performing the operations required in order to encode a composite information entity 300 from two (or more, if concatenated) information entities 205 stored in memory means 600, and to decode a composite information entity 300 into two (or more, where applicable) information entities 205 (cf. steps 525 and 530 of FIG. 5). Node 105 further comprises an algorithm handler 610 and a protocol handler 615, as well as a controller 620. The algorithm handler 610 comprises processing means and computer program code for controlling various processes, and could for example include processing means and computer program code for announcing the available information entities 205 to other nodes 105 (cf. step 510 of FIG. 5), for calculating benefit measures of possible composite information entities 205, for determining which information entities 205 should be transmitted to other nodes, for determining whether the information entities 205 to be transmitted should be encoded into a composite information entity 300, for determining whether node 205 should poll/request any other nodes 105 for information, (cf. steps 515 and 520 of FIG. 5), for determining a benefit measure of the composite messages 400 if applicable, etc. In particular, the algorithm handler comprises processing means and computer program code for comparing identification data identifying information entities (205) stored in node 105 with information entity identifiers identifying information entities (205) stored in other nodes 105. The protocol handler comprises processing means and computer program code for encapsulating any transmitted information into a protocol format used by the other nodes 105 in the ad hoc network 100, as well as computer program code for de-capsulation of the payload contained in any messages received from other nodes 105 (cf. step 525 of FIG. 5). Controller 620 controls the overall operation of node 105, and comprises inter alia processing means and computer program code for detecting other nodes 105 and forming ad hoc networks 100 (cf. step 500 of FIG. 5). Node 105 of FIG. 6 further includes input/output ports 625, which could for example be connected to a radio or infra-red transmitter.

A node 105 reveals, to the other nodes 105 of ad hoc network 100, information about the contents 200 carried by node 105. Contents 200 that are of interest to exchange typically comprises information entities 205 that belong to a file exchange application. Hence, from a protocol layer point of view, the invention is particularly applicable to the exchange of information entities 205 in the application layer. The order in which packets in the application layer is sent can advantageously be coupled to the MAC layer.

The invention of encoding two (or more) information entities 205 into a composite information entity 300, based on which information entities 205 are stored a priori in the nodes 105 of the ad hoc network 100, can be applied in a number of information exchange scenarios in an ad hoc network 100, such as ones disclosed in the publications discussed above by M. Jacobsson et al. and Bach et al.

As seen above, the invention contributes to reducing the amount of bandwidth used when transmitting a at least a first information entity 205 from a first node 105 to one (or more) second node(s) 105 and a second information entity 205 from the first node 105 to one (or more) third node(s) 105 when the first and third node(s) 105 have a prior knowledge of the first information entity 205 and the first and second node(s) 105 have a priori knowledge of the second information entity 205B. The a priori knowledge of a node could in a typical situation have been acquired prior to the forming of the ad hoc network 100, but also when the a priori knowledge is acquired after the ad hoc network was formed from a source which is not part of the ad hoc network 100, a throughput gain will be achieved. A throughput gain would also be achieved when the transmitting node 105A has acquired the knowledge of the information entities 205 included in a composite message 300 from another node 105 in ad hoc network that is not within the transmission coverage of all other nodes 105. The invention is applicable to ad hoc networks 100 where the transmission links between the nodes 105 are stable and where no re-transmission of messages is required, as well as in less stable transmission environments.

One skilled in the art will appreciate that the present invention is not limited to the embodiments disclosed in the accompanying drawings and the foregoing detailed description, which are presented for purposes of illustration only, but it can be implemented in a number of different ways, and it is defined by the following claims.

The invention claimed is:

1. A method of transferring at least a first information entity from a first node to a second node, and a second information entity from the first node to a third node, and wherein the first node comprises the first and second information entities, the second node comprises the second information entity, and the third node comprises the first information entity, the method comprising:
    forming an ad hoc network including at least the first, second, and third nodes;
    receiving, at the first node, first identification data identifying one or more information entities stored in a memory associated with the second node, and second identification data identifying one or more information entities stored in a memory associated with the third node;
    using the first and second identification data to identify, at the first node, the first and second information entities;
    jointly encoding, at the first node, at least the first information entity and the second information entity to generate a composite information entity that can be decoded using at least one of the first information entity and the second information entity; and
    transmitting, from the first node, a composite message comprising the composite information entity.

2. The method of claim 1 further comprising not transmitting either of the first and the second information entities from the first node to the second or third nodes after the ad hoc network has been formed and prior to the step of transmitting the composite message.

3. The method of claim 1 wherein the receiving step comprises receiving at least one of the first and second identification data via a user interface.

4. The method of claim 1 wherein the receiving step comprises receiving at least one of the first and second identification data via a connection to another node in the ad hoc network.

5. The method of claim 4 further comprising, prior to the receiving step, sending a polling message from the first node polling for identification data that identifies information entities stored in connection with at least one of the second and the third nodes.

6. The method of claim 1 further comprising sending, from the first node, an announcement message comprising identification data that identifies one or more information entities stored in the memory associated with the first node, and which are available for transmission to other nodes in the ad hoc network.

7. The method of claim 1 further comprising calculating a benefit measure of the composite information entity such that the benefit measure reflects a throughput gain achieved by transmitting the composite information entity instead of the first and second information entities.

8. The method of claim 7 further comprising determining a scheduling for the composite message based on benefit measures of composite information entities formed by the first node, and on benefit measures of composite information entities formed by other nodes in the ad hoc network.

9. The method of claim 8 wherein the identification data identifying an information entity comprises information on a length of the information entity, and wherein the information on the length of an information entity is used in the calculation of a benefit measure of a composite information entity including the information entity.

10. The method of claim 1 wherein the information entities comprise information entities in an application layer.

11. The method of claim 1 wherein the step of jointly encoding comprises jointly encoding the first information entity and the second information entity over a Galois field.

12. The method of claim 1 wherein transmitting, from the first node, a composite message comprises forming the composite message to comprise a first part including an identification of the first and second information entities, and a second part including the composite information entity.

13. The method of claim 1 further comprising:
    receiving, at the first node, a composite message comprising a composite information entity from another node in the ad hoc network; and
    decoding the received composite information entity using at least one information entity stored in memory associates with the first node.

14. The method of claim 1 wherein the first, second, and third nodes are peer nodes in which none of the first, second, and third nodes have a responsibility for transmitting in the ad hoc network that is different than the responsibilities of the other nodes.

15. The method of claim 14 wherein at least two of the first, second, and third nodes forming the ad hoc network perform the steps of jointly encoding and transmitting while the ad hoc network is formed.

16. The method of claim 1 wherein the step of jointly encoding comprises jointly encoding at least three information entities into a composite information entity such that the composite information entity can be decoded by using less than all of the at least three information entities used in the encoding.

17. A method of acquiring information in a node in an ad hoc network, wherein the node comprises a priori information including at least one information entity, the method comprising:

transmitting identification data identifying information entities stored in a memory associated with the node;

receiving a composite message comprising a composite information entity formed by jointly encoding at least two information entities and identity information identifying the information entities that were used to form the composite information entity;

checking the identity information to determine whether at least one information entity stored in the memory associated with the node comprises information sufficient to decode the composite information entity; and if the at least one information entity comprises sufficient information, decoding the composite information entity using the a priori information.

18. A non-transitory computer readable medium having program code stored thereon for controlling the transfer of information from a first node comprising first and second information entities, the program code configured to control a computing device executing the program code to:

send and receive signaling messages associated with forming an ad hoc network including at least the first node, a second node, and a third node;

receive first identification data that identifies one or more information entities stored in a memory associated with the second node, and second identification data identifying one or more information entities stored in connection with the third node;

use the first and second identification data in identifying the first and second information entities;

jointly encode at least the first information entity and the second information entity into a composite information entity such that the composite information entity can be decoded using at least one of the first information entity and the second information entity; and transmit, from the first node, a composite message comprising the composite information entity.

19. The non-transitory computer readable medium of claim 18, wherein the non-transitory computer readable medium having the program code stored therein is sized to fit in a battery-powered device comprising at least one of a lap-top computer, a personal digital assistant, an MP3 player, and a multimedia mobile phone.

20. A portable node capable of forming an ad hoc network with other nodes, the portable node comprising;

a first memory configured to store information entities;

an input configured to receive first identification data identifying one or more information entities stored in a memory associated with a second node and second identification data identifying information entities stored in a memory associated with a third node;

a second memory configured to store internal identification data identifying information entities stored in the first memory;

a comparator configured to compare the internal identification data with the first and second identification data to identify a first information entity associated with both the first and second node and stored in the first memory, and a second information entity associated with both the first and third node and stored in the first memory;

an encoder configured to jointly encode at least the first information entity and the second information entity stored in the first memory to form a composite information entity that can be decoded using at least one of the first information entity and the second information entity; and an output, coupled to the encoder, configured to output a composite message including the composite information entity.

21. The portable node of claim 20 wherein the information entities comprise files including at least one of music and films.

22. The portable node of claim 20 further comprising:

an input configured to receive a composite message comprising a composite information entity; and a decoder configured to decode the received composite information entity using an information entity stored in the first memory.

* * * * *

UNITED STATES PATENT AND TRADEMARK OFFICE
CERTIFICATE OF CORRECTION

| | | |
|---|---|---|
| PATENT NO. | : 8,243,655 B2 | Page 1 of 1 |
| APPLICATION NO. | : 12/517747 | |
| DATED | : August 14, 2012 | |
| INVENTOR(S) | : Larsson et al. | |

It is certified that error appears in the above-identified patent and that said Letters Patent is hereby corrected as shown below:

In Column 12, Line 4, delete "entitie(is)" and insert -- entiti(es) --, therefor.

In Column 14, Line 18, in Claim 7, delete "refiects" and insert -- reflects --, therefor.

In Column 16, Line 5, in Claim 20, delete "comprising;" and insert -- comprising: --, therefor.

Signed and Sealed this
Eighteenth Day of December, 2012

David J. Kappos
*Director of the United States Patent and Trademark Office*